United States Patent [19]

Kuhn

[11] Patent Number: 5,797,628

[45] Date of Patent: Aug. 25, 1998

[54] CONDUIT VIBRATION-DECOUPLING DEVICE

[75] Inventor: Rainer Kuhn, Germaringen, Germany

[73] Assignee: Feodor Burgmann Dichtungswerke GmbH & Co., Wolfratshausen, Germany

[21] Appl. No.: 657,305

[22] Filed: Jun. 3, 1996

[30] Foreign Application Priority Data

Jun. 8, 1995 [DE] Germany .................... 259 09 434.6 U

[51] Int. Cl.⁶ .................................................. F16L 55/033
[52] U.S. Cl. ........................ 285/49; 285/226; 285/299
[58] Field of Search ............................ 285/49, 226, 299, 285/300, 301

[56] References Cited

U.S. PATENT DOCUMENTS

| 3,019,037 | 1/1962 | Caldwell ............................ 285/226 |
| 3,084,957 | 4/1963 | Caldwell ............................ 285/301 |
| 4,659,117 | 4/1987 | Holzhausen et al. ............... 285/49 |
| 4,746,148 | 5/1988 | Perkins ............................... 285/226 |
| 4,911,482 | 3/1990 | Doat ................................... 285/226 |
| 5,090,746 | 2/1992 | Holzhausen ........................ 285/226 |
| 5,299,837 | 4/1994 | Lagier ................................. 285/49 |
| 5,318,329 | 6/1994 | Suzuki et al. ....................... 285/49 |
| 5,340,165 | 8/1994 | Sheppard ........................... 285/226 |
| 5,354,104 | 10/1994 | Senes et al. ....................... 285/235 |
| 5,403,044 | 4/1995 | Holl .................................... 285/226 |

FOREIGN PATENT DOCUMENTS

| 0 432 436 | 6/1991 | European Pat. Off. . |
| 0 453 691 | 10/1991 | European Pat. Off. . |
| 1428758 | 1/1966 | France ............................... 285/300 |
| 2701753 | 2/1993 | France . |
| 1 450 409 | 5/1969 | Germany . |
| 2703064 | 7/1978 | Germany ........................... 285/226 |
| 42 33 644 | 4/1994 | Germany . |
| 44 01 827 | 8/1994 | Germany . |
| 221378 | 8/1942 | Sweden ............................. 285/300 |
| 627120 | 7/1949 | United Kingdom ................ 285/226 |
| 695015 | 8/1953 | United Kingdom ................ 285/301 |
| 1 555 293 | 11/1979 | United Kingdom . |
| 2 253 888 | 9/1992 | United Kingdom . |
| 2 278 414 | 11/1994 | United Kingdom . |
| 2278413 | 11/1994 | United Kingdom ................ 285/49 |
| 94/08169 | 4/1994 | WIPO . |

Primary Examiner—Eric K. Nicholson
Attorney, Agent, or Firm—Griffin, Butler, Whisenhunt & Szipl

[57] ABSTRACT

A conduit vibration decoupling device, particularly for installation in exhaust conduit systems of internal combustion engines, comprises a pair of axially spaced conduit connector members connected with each other by a flexible bellows-type sealing conduit element, and a force transfer means having at least axial pliancy for transferring forces between the conduit connector members. The force transfer means comprises a housing extending between the conduit connector members along the flexible conduit element and connected near at least one of its axial ends by an articulated spring assembly comprising at least one annular spring element to the associated conduit connector member. The spring element extends around the periphery of the conduit connector member and can be either an annular disk-shaped element or an annular element made of a metallic cable material. The housing may be free of outer protruding parts thereby it may have an outer smooth, cylindrical configuration. It may also have a rigid structure.

27 Claims, 3 Drawing Sheets

CONDUIT VIBRATION-DECOUPLING DEVICE

BACKGROUND OF THE INVENTION

The invention relates to conduit vibration decoupling devices. The invention relates in particular to conduit vibration decoupling devices for installing in exhaust conduit systems of internal combustion engines.

A known decoupling device (DE-A-44 01 827) comprises a housing made of two parts which are connected to each other by an element extending around the outer periphery of the housing thereby protruding radially therefrom. Each housing part is connected in a rigid manner, e.g. by welding to the associated conduit connector member. The necessary axial or angular pliancy of the housing is achieved by portions of the housing exhibiting a spring elasticity. According to an earlier invention of the present applicant (DE-A-42 33 644) is also known that a helical spring surrounding the bellows-type conduit element extends between short stiff housing end pieces which are rigidly compressed with the corresponding conduit connector members. A common disadvantage of the prior decoupling devices is that they are not suitable to be designed in a manner to have a tubular, substantially smooth cylindrical outer configuration, as is principally desired for reasons of fitting, storage and space requirements. In addition, the known decoupling devices have a complicated structure due to the multi-part configuration of the housing and the means creating the axial and angular pliancy, so that their production is comparatively complicated and costly. A further disadvantage of some known decoupling devices is that they, as a rule, are heavy and require increased space for their arrangement in the exhaust systems of internal combustion engines which run contrary to the trend in the automotive field of providing more compact and lighter power systems. However, it has also already been proposed (US-A-3,369,829) to relocate the pliant connection between the housing and the conduit connector members to the ends of the housing so that the housing itself can be configured principally cylindrical, i.e. without protruding parts. The necessary pliancy is achieved by spring elements at each end of the housing and a split bellows-type conduit element. This arrangement accordingly involves a considerable constructional expense and is, in addition, questionable as to its fluid sealing capacity. Another arrangement (US-A-S 299,837) improved in this respect, includes a bellows-type conduit element integrally connected to the conduit connector members thereby fluid-tight and comprises a plurality of rings made of metallic cable which are disposed in a space between a conduit connector member and a housing near to one of the axial ends thereof. Each ring is connected at one portion thereof to the housing and another diametrally opposed portion to the conduit connector member. A disadvantage of this arrangement is that for accommodating the rings an increased space must be provided between the housing and the conduit connector member so that such decoupling devices hardly have compacter constructional dimensions than those have a split housing and helical springs for connecting the housing halves to each other. Further each type of prior elastic joint at the end of the housing is principally torsionally weak which is undesirable since the bellows-type conduit element cannot be protected from torsion loads to which it is particularly sensitive.

SUMMARY OF THE INVENTION

An object of the invention is to create a decoupling device by which one or more of the aforementioned disadvantages of the prior decoupling devices can be avoided. In particular it is an object of the invention to provide substantially torsionally stiff decoupling device with minimum dimensions, which can be formed readily in a smooth, cylindrical, e.g. tubular configuration and fabricated with less costs in comparitively few steps thereby suitable for large-series production. Further objects of the invention are: providing a decoupling device of the aforementioned kind having overload protection by a progressive spring characteristic in tensional and compressional loading; a lateral deflection stiffness despite its property of allowing compensation of assembly tolerances; suitable flexural pliancy accommodating engine dive movements.

The decoupling device in accordance with the present invention comprises a pair of axially spaced conduit connector members connected to each other by a flexible, in particular bellows-type sealing conduit element, and a force transfer means having at least axial pliancy for transferring forces between the conduit connector members, the force transfer means comprising a housing extending between the conduit connector members along the flexible conduit element and connected near at least one of its axial ends by an articulated spring assembly comprising at least one spring element to the associated one of the conduit connector members. Said spring element has an annular configuration extending along the periphery of the conduit connector member and is attached at a plurality of peripherally distant mounting portions to said housing and at another plurality of peripherally distant mounting portions to said conduit connector member, in which said mounting portions of the conduit connector member being peripherally offset to said mounting portions of the housing.

Accordingly, the housing in a manner known per se, in the region of at least one of its axial ends, preferably at both ends, is connected to the adjoining conduit connector member not rigidly but via an articulated spring assembly endowing the decoupling device axial and angular pliancy. In a particularly advantageous aspect of the invention the housing may thus be configured integrally stiff and smoothly cylindrical without parts protruding from the outer periphery of the housing since the means providing the pliancy are near the portion of the facing ends of the decoupling device. Each spring element of the articulated spring assembly is a continuous annualar element arranged substantially concentrically to the conduit connector member, this ring element being connected alternatingly to the housing and the conduit connector respectively at a plurality of mounting portions. The intermediate regions between adjacent mounting portions create the necessary flexible pliancy without an increased space requirement being necessary therefor.

At the same time, the arrangement of the spring elements according to the present invention facilitates production of the decoupling device, in that the spring elements, due to their structure, require no special production know how thereby can be manufactered at low costs. The articulated spring assembly can be easily adapted to different load situations and to other desired specifications simply by e.g. changing the number of concentric annular spring elements.

The spring elements may be advantageously configured as essentially plane disk-shaped elements. Such disk-shaped spring elements are principally torsionally stiff and thus suitable to effectively protect the bellows-type conduit element from damaging torsional stresses. Nevertheless an articulated spring assembly of this type may have good flexural pliancy, in which the principally progressive spring characteristic of disk-shaped spring elements being particularly advantageous in this respect, i.e. the articulated spring assembly may be designed so that a desired flexural pliancy exists in the normal operating range whilst with increasing deflection the articulated spring assembly becomes stiffer due to the progressive spring characteristic which in the case of high stresses ensures the elimination of damaging deformations and also offers advantages as regards the vibration behaviour of the decoupling device, since a little risk of resonance exists only. Several disk-shaped spring elements may be grouped together into a spring unit which creates a good vibration damping effect due to the friction between the individual disk-shaped spring elements. This enables additional means of damping the vibrations in the form of damping inserts to be dispensed with.

The transfer of forces between the conduit connector members and the housing is preferrably achieved through three-point connections so that the resulting force is located on the center line axis of the decoupling device and causes no flexural moment. An exhaust system fitted with a decoupling device in accordance with the invention is thus reliably supported.

Since according to the invention the housing may be configured to have a smooth outer periphery, the components accommodated therein, such as the bellows-type conduit element as well as an additional damping element are effectively protected from external ambient influencing factors. If desired, the housing may be open at the ends so that the components accommodated therein may be effectively through-ventilated which offers protection from corrosion.

In accordance with another aspect of the invention which is particularly advantageous from the production point of view the spring element may be formed as a continuous metallic cable element arranged concentrically to the conduit connector member concerned. Such a spring element requires little radial and axial space, thus permitting dimensions of the decoupling device which do not differ substantially from those of so-called flex hoses as are often employed in exhaust systems. The spring characteristic of such an articulated spring assembly is under tensile and compressive stress substantially symmetrical, but progressively. This at the same time affords effective protection against overloading along with good vibration decoupling behaviour under normal operating conditions. The articulated spring assembly according to this alternative embodiment of the invention is sufficiently torsionally stiff, it thus protecting the bellows-type conduit element effectively from harmful torsional stress. Annular cable spring elements may be prefabricated and assembled as a unit. The articulated spring assembly may be shielded off from the outside by a radial portion of the housing which also provides an effective axial movement limit which protects the bellows-type conduit element and the cable-type spring element from excessive deflection during assembly or transport. At the same time the components within the housing are protected from damage, e.g. due to stone impact, and the acoustic behaviour of the decoupling device is improved as compared to an arrangement having a housing open at the ends.

BRIEF DESCRIPTION OF THE DRAWINGS

The invention will now be described in more detail on the basis of embodiments and the drawing in which:

FIG. 1 is a partially longitudinally sectioned view of a disk-shaped spring decoupling device in accordance with a first embodiment of the invention, FIG. 2 shows the disk-shaped spring decoupling device of FIG. 1 in a side view, FIG. 3 shows in a partially fragmented view a disk-shaped spring decoupling device in accordance with a second embodiment of the invention, FIG. 4 shows in a view similar to that of FIG. 1 a disk-shape spring decoupling device in accordance with a third embodiment of the invention, FIG. 5 shows the metallic cable spring decoupling device in a fragmented longitudinally sectioned view, and FIG. 6 shows the metallic cable spring decoupling device in a view along the section line VI—VI in FIG. 5.

Figure 1:
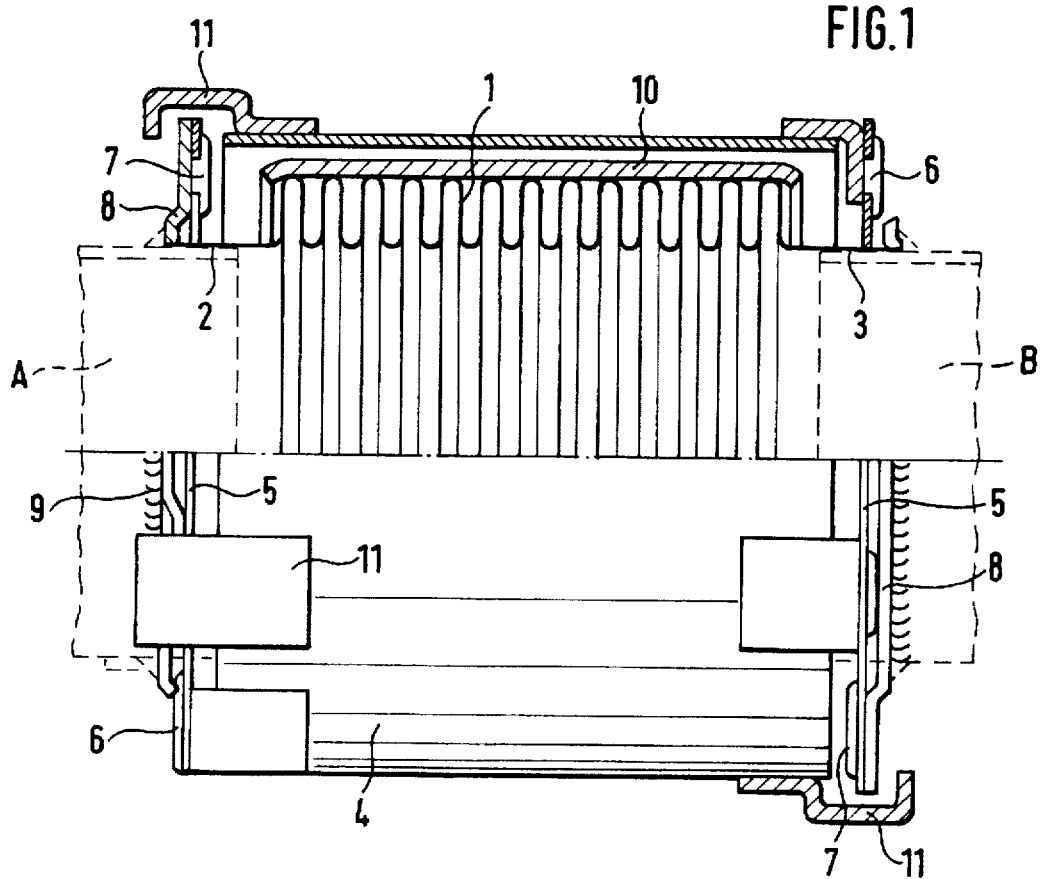
FIGS. 1–4 show embodiments of decoupling devices according to the invention including an articulated spring assembly on the basis of disk-shaped spring elements whereby

A feature common to all embodiments of decoupling devices according to the present invention is a bellows-type corrugated full-length conduit element 1 of a suitable material such as metal, at each axial end of which a cylindrical conduit connector member 2, 3 is provided. The conduit connector members 2, 3 may be an integral part of the conduit element 1 or secured thereto in a fluid-tight manner, e.g. by welding. They serve for connecting the decoupling device with the ends indicated at A and B of e.g. an exhaust line of an internal combustion engine as shown by the dashed lines. Disposed concentrically to the center longitudinal axis of the bellows-type conduit element 1 and radially spaced therefrom is a housing 4 which surrounds the conduit element 1. The housing 4 may protrude by its axial end portions beyond the axial ends of the conduit element 1 and may have the shape of a stiff, cylindrical tube section having a smooth outside. However, the invention is not restricted to such a configuration of the housing 4, more details in this respect being given further below.

For an improved vibration-damping capacity of the decoupling device a damping insert 10 in the form of tubular metal wire mesh which is in contact with an outer periphery with the conduit element 1 and may be provided in the space between the conduit element 1 and the housing 4.

Figure 2:
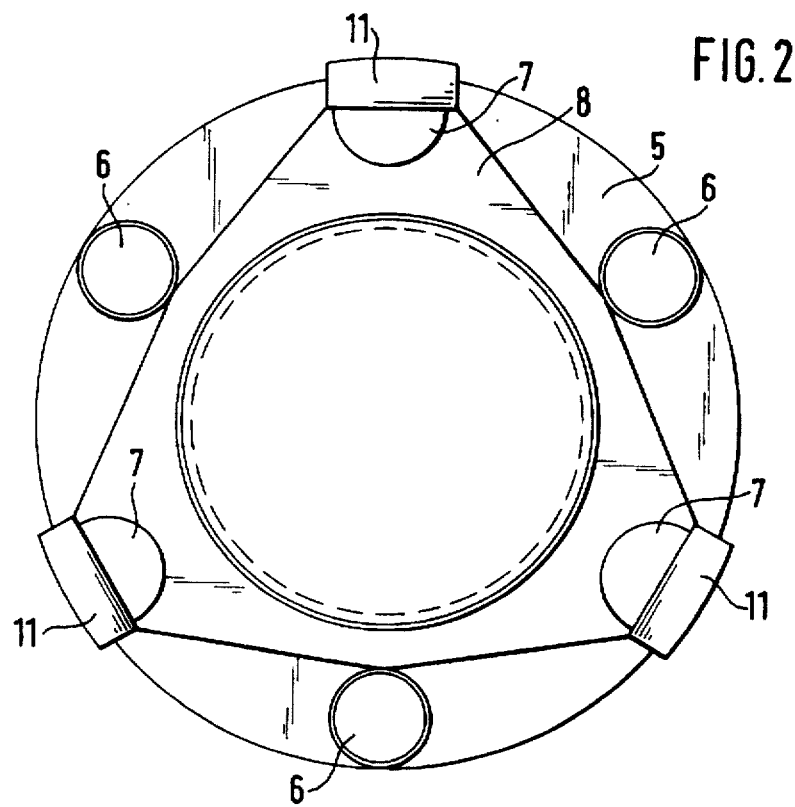

With reference specially to FIGS. 1 and 2 an articulated spring assembly comprising an annular disk-shaped spring element 5 extending in a substantially radial plane is provided near each axial end of the housing 4 concentric to the center longitudinal axis of the bellows-type conduit element 1. At three portions or points 6 arranged peripherally equispaced angularly from each other the disk-shaped spring element 5 is fixedly connected to the housing 4 as well as at three portions or points 7 also arranged equispaced angularly from each other to a holder or bracket 8. For connecting the disk-shaped spring element 5 to the housing 4 angled brackets may be secured thereto. The holder 8, as is indicated at 9, may be welded or fixedly secured by other means to the corresponding conduit connector member 2 or 3 together with the associated end portion A and B of the exhaust conduit respectively. The peripheral locations of the mounting points 7 relative to the holder 8 on the one hand and of the mounting points 6 relative to the housing 4 on the other hand are offset from each other so that each mounting point 6 of the housing 4 is located between a pair of adjacent mounting points 7 of the holder 8. As a result, free regions of the disk-shaped spring element 5 remain between adjacent mounting points 6, 7, which permit a limited axial and angular relative movement between the corresponding conduit connector member 2 and 3 respectively and the housing 4 as a kind of articulated joint. In addition to this the articulated spring assemblies at both axial ends of the housing 4 coact to make a radial offset of the center longitudinal axes of the conduit connector members 2, 3 additionally possible.

In the embodiment of the invention shown, rivets are provided for the housing and holder relevant mounting points 6, 7. It will readily be appreciated that also other suitable connecting means may be put to use in this respect, e.g. spot welding, spot bonding, a clamping techniques or screw fasteners. Furthermore, the number of housing and support relevant mounting points 6, 7 in each case is not restricted to three in number. Instead, more than three or even only two such connections could be provided, whereby the higher this number of connections the greater becomes the resistance with which the disk-shaped spring element 5 counteracts an axial or angular relative movement between the housing 4 and the conduit connector members 2, 3. Further the distribution of the housing and support relevant mounting points 6, 7 along the periphery of the disk-shaped spring element 5 may be non-uniform, as a result of which the stiffness of the disk-shaped spring element 5 along its periphery will differ and a decoupling device having directionally dependent axial and angular pliancy is obtainable.

If desired, at portions near the axial ends of the housing 4 movement limiters 11 may be provided which hook around the outside of the disk-shaped spring element 5 by their hook-shaped sections to limit the axial and angular relative movement between the housing 4 and the disk-shaped spring element 5 thereby preventing overloading of the articulated spring assembly.

In the embodiment of the invention as described above the articulated spring assembly comprises a single annular disk-shaped spring element 5. If desired, several disk-shaped spring elements 5 may be arranged one behind the other. e.g. in the form of a spring pack or unit, as a result of which the spring stiffness of the articulated spring assembly is able to be altered or influenced accordingly. Such a spring pack may have a good vibration damping property due to the friction between the individual disk-shaped spring elements 5.

Furthermore, several disk-shaped spring elements 5 or spring pack units may be arranged spaced from each other concentrically one behind the other by interposing spacers between the disk-shaped spring elements 3 or spring packs, this affecting a corresponding increase in the spring travel. In addition, the disk-shaped spring element 5 must not necessarily have a circular configuration. Instead, it may also have a polygonal annular configuration or, if desired, it can be composed of individual linear sections connected to each other into an annular shape. As an alternative each disk-shaped spring element could also be configured corrugated so as to create inherently a spaced relation to the adjacent disk-shaped spring element.

Figure 3:
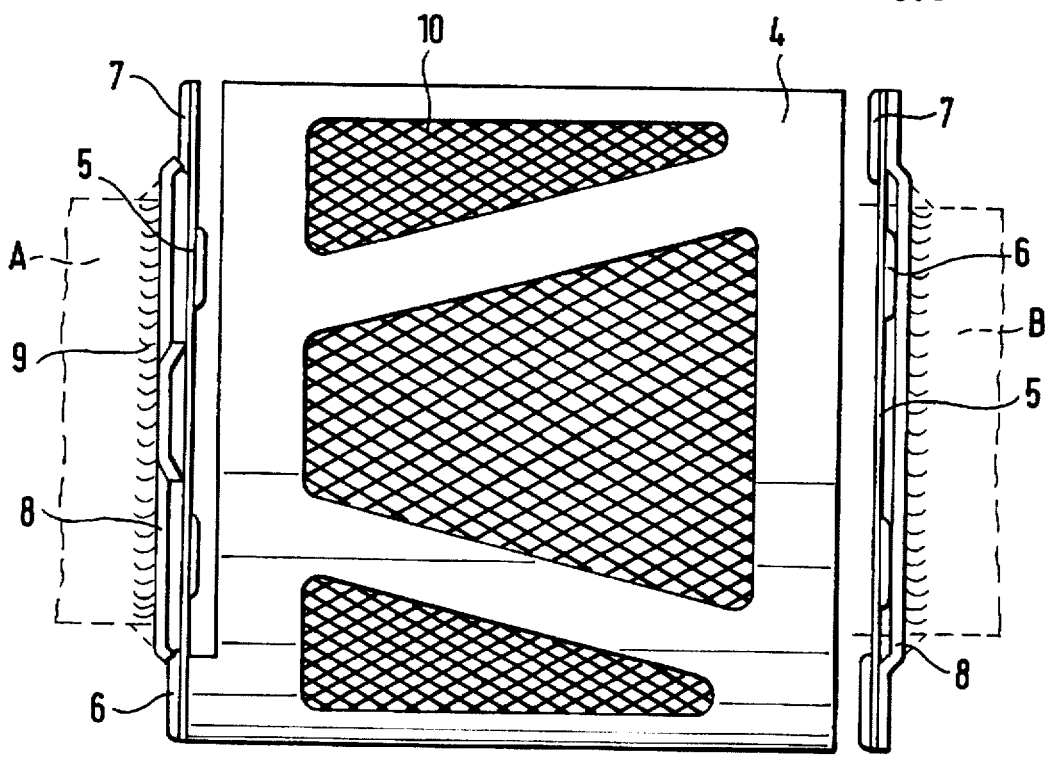

FIG. 3 shows a further embodiment of the invention which substantially differs from the embodiment described above and shown in FIGS. 1 and 2 only in that the housing 4 includes a plurality of openings arranged distributed peripherally to save weight, at which the damping insert 10 can be exposed to the outside. Movement limitters are omitted in this embodiment but may be provided if desired. As regards the remaining configuration of the embodiment according to FIG. 3 reference may be made to the description of the first embodiment, whereby components like or similiar to those of the first embodiment are carrying like reference numerals.

Figure 4:
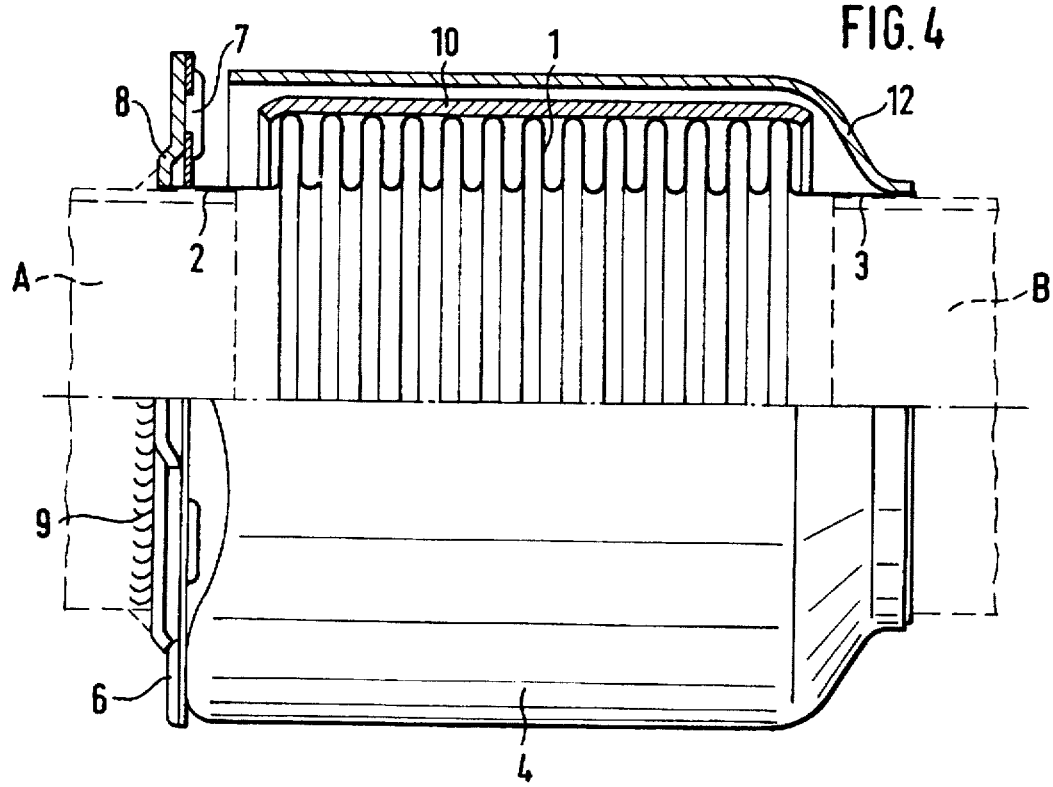

The third embodiment of the invention shown in FIG. 4 differs from the first embodiment by the housing 4 being connected to the corresponding conduit connector member 2 only near one axial end by an articulated spring assembly of the kind as described above, whilst at its other axial end the housing 4, as indicated at 12, may be angled in the direction of the corresponding conduit connector member 3 and directly welded thereto. The third embodiment has merely axial and angular pliancy, but no possibility of radial displacement of the center longitudinal axes of the conduit connector members 2, 3. Otherwise as regards the further components of the third embodiment reference is made to the already described embodiments.

Figure 5:
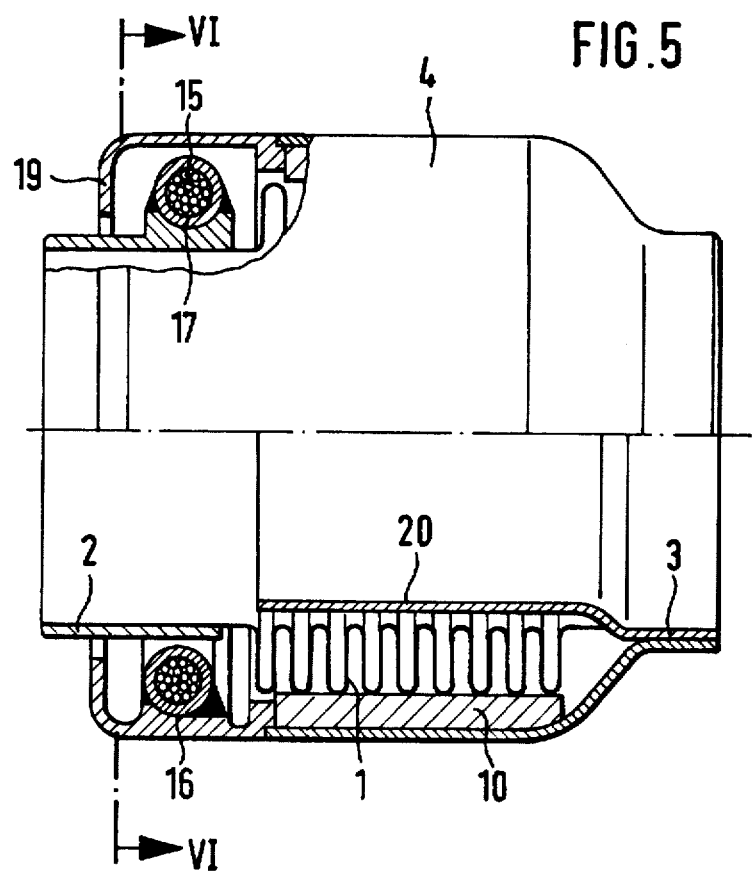
FIGS. 5–6 show an embodiment of a decoupling device according to the invention including an articulated spring assembly on the basis of a spring element made of a metallic cable material, in which shows
Figure 6:
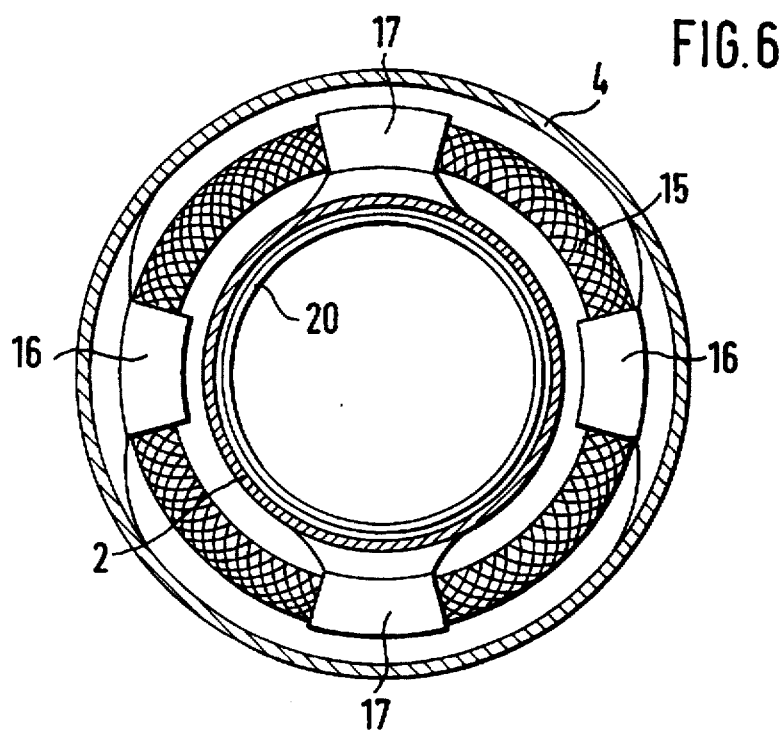

In FIGS. 5 and 6 an embodiment of the invention including an articulated spring assembly is shown which instead of an annular disk-shaped spring element comprises a spring element 15 made of a suitable metallic cable material continuously extending along the periphery of the downstream conduit connector member 2 and disposed in one axial end portion of the housing 4. The spring element 15 may be connected analogous to the disk-shaped spring element of the embodiment described previously to the housing 4 and conduit connector member 2 respectively at portions 16, 17 offset from each other peripherally. These connections may be made by way of a weld joint or preferably by means of sockets accomodating the spring element 15 which are secured to the housing 4 and conduit connector member 2 respectively, e.g. by welding. The sockets can be formed from sections of these components by shaping as can be seen from FIG. 6. Although another suitable distribution and number of mounting portions 16, 17 could be provided, it is preferred that at least a pair of mounting portions 16 at the housing end and a pair of mounting portions 17 at the conduit connector member end is provided. The mounting portions of each pair are disposed preferrably in a diametrally opposed relationship.

As is shown, the metallic cable spring element 15 can be accommodated completely within the contour lines of the housing 4 and can thereby effectively be protected from outer influencing effects such as stone impingement. If desired two or more metallic cable spring elements 15 may be assembled resulting in a corresponding increase of the spring characteristic.

As is indicated at 19, a radial extension angled in the direction of the conduit connector member 2 is formed at the housing 4, this extension 19 screening off the space axially between the housing 4 and the conduit connector member 2 including the articulated spring assembly accommodated therein.

A tubular heat shielding element 20 is fitted to and extends from the upstream conduit connector member 3 coaxially to the center longitudinal axis of the decoupling device a suitable distance along the length of the conduit element 1. The heat shielding element 20 has the purpose of preventing overheating of the conduit element 1. It will be appreciated that a heat shield element 20 may also be omitted, if desired, or may be added to the embodiments of the invention having an articulated disk-shaped spring assembly as shown in FIGS. 1–5.

As regards the remaining structure of the embodiment of the invention according to FIGS. 5 and 6 reference may otherwise be made to the description of the disk-shaped spring embodiments according to FIGS. 1–4. Although in FIGS. 5 and 6 an articulated spring assembly on the basis of a metallic cable spring element 15 is provided only in a portion near one axial end of the housing 4, such an assembly could also be provided in both axial end portions of the housing 4.

The articulated spring assembly of all embodiments of the invention as previously described are fundamentally torsionally stiff, they preferably being employed together with a bellows-type corrugated conduit element 1 in which the corrugations are located in a radial plane so that the conduit element 1 is also fundamentally torsionally stiff. This torsionally stiff configuration of the articulated spring assembly enables the bellows-type conduit element 1 to be effectively protected against being overloaded.

What is claimed is:

1. A conduit vibration-decoupling device for installation in exhaust conduit systems of internal combustion engines, comprising a pair of axially spaced first and second conduit connector members connected to each other by a flexible bellows sealing conduit element, and a force transfer means having at least axial pliancy for transferring forces between the first and second conduit connector members, said force transfer means comprising a rigid housing extending between the first and second conduit connector members and over and along the flexible bellows sealing conduit element, said housing having first and second end portions with a first end portion being adjacent said first conduit connector and said second end portion being adjacent said second conduit connector, wherein at least said first end portion is connected by an articulated spring assembly comprising at least one spring element to the adjacent first conduit connector member of said conduit connector members, said spring element having an annular configuration and extending continuously around the periphery of said first conduit connector member and being attached at a plurality of peripherally spaced mounting portions to said housing and at another plurality of peripherally spaced mounting portions to said first conduit connector member, said mounting portions to said first conduit connector member being peripherally offset to said mounting portions to said housing.

2. The vibration-decoupling device as set forth in claim 1, wherein said spring element has a disk-shaped configuration.

3. The vibration-decoupling device as set forth in claim 2, wherein a plurality of disk-shaped spring elements are grouped together into a spring pack.

4. The vibration-decoupling device as set forth in claim 2, wherein said mounting portions between the disk-shaped spring element and the first conduit connector member, on the one hand, and the disk-shaped spring element and the housing, on the other hand, are dimensioned to provide essentially point-like connections therebetween.

5. The vibration-decoupling device as set forth in claim 4, wherein at least two mounting portions are provided between each of the disk-shaped spring element and the first conduit connector member and the disk-shaped spring element and the housing, respectively.

6. The vibration-decoupling device as set forth in claim 1, wherein said housing has a substantially cylindrical shape.

7. The vibration-decoupling device as set forth in claim 1, wherein said second end portion of said housing is connected to the second conduit connector member in a rigid manner.

8. The vibration-decoupling device as set forth in claim 1, wherein each of said first and second end portions of said housing is connected by an articulated spring assembly to the adjacent one of the first and second conduit connector members.

9. The vibration-decoupling device as set forth in claim 1, wherein at least one of axial and angular relative movements between the first conduit connector member and the first end portion of the housing is stop-limited.

10. The vibration-decoupling device as set forth in claim 1, wherein said spring element is a continuous element made of a metallic cable material.

11. The vibration-decoupling device as set forth in claim 10, wherein said articulated spring assembly comprising said at least one metallic cable spring element is fully accommodated within said housing.

12. The vibration-decoupling device as set forth in claim 11, wherein said articulated spring assembly is screened off substantially from the outside by a radial portion of said housing.

13. The vibration-decoupling device as set forth in claim 1, wherein a tubular heat shield element is fitted to an upstream one of the first and second conduit connector members, said tubular heat shield element protruding into said flexible, bellows-type conduit element.

14. A conduit vibration-decoupling device for installation in exhaust conduit systems of internal combustion engines, comprising a pair of axially spaced first and second conduit connector members connected to each other by a flexible bellows sealing conduit element, and a force transfer means having at least axial pliancy for transferring forces between the first and second conduit connector members, said force transfer means comprising a rigid housing extending between the first and second conduit connector members and over and along the flexible bellows sealing conduit element, said housing having first and second end portions with a first end portion being adjacent said first conduit connector and said second end portion being adjacent said second conduit connector, wherein at least said first end portion is connected by an articulated spring assembly comprising at least one spring element to the adjacent first conduit connector member of the conduit connector members, said spring element being an annular disk-shaped spring element extending continuously around the periphery of the first conduit connector member and being attached at a plurality of peripherally spaced mounting portions to the housing and at another plurality of peripherally spaced mounting portions to the first conduit connector member the latter being peripherally offset to the mounting portions of the housing.

15. The vibration-decoupling device as set forth in claim 14, wherein a plurality of disk-shaped spring elements are grouped together into a spring pack unit.

16. The vibration-decoupling device as set forth in claim 14, wherein said mounting portions between the disk-shaped spring element and the first conduit connector member, on the one hand, and the disk-shaped spring element and the housing, on the other hand, are dimensioned to provide substantially point-like connections therebetween.

17. The vibration-decoupling device as set forth in claim 14, wherein at the housing and first conduit connector member, at least two point mounting portions are provided.

18. The vibration-decoupling device as set forth in claim 14, wherein said housing has a substantially cylindrical shape.

19. The vibration-decoupling device as set forth in claim 14, wherein said second end portion of said housing is connected to the second conduit connector member in a rigid manner.

20. The vibration-decoupling device as set forth in claim 14, wherein at least one of axial and angular relative movements between the first conduit connector member and the first end portion of the housing is stop-limited.

21. The vibration-decoupling device as set forth in claim 14, wherein a tubular heat shield element is fitted to an upstream one of the first and second conduit connector members, said tubular heat shield element protruding into said flexible, bellows-type conduit element.

22. A conduit vibration-decoupling device for installation in exhaust conduit systems of internal combustion engines, comprising a pair of axially spaced first and second conduit connector members connected to each other by a flexible bellows sealing conduit element, and a force transfer means having at least axial pliancy for transferring forces between the first and second conduit connector members, said force transfer means comprising a rigid housing extending between the first and second conduit connector members and over and along the flexible bellows sealing conduit element, said housing having first and second end portions with a first end portion being adjacent said first conduit connector and said second end portion being adjacent said second conduit connector, wherein at least said first end portion is connected by an articulated spring assembly comprising at least one spring element to the adjacent first conduit connector member of said conduit connector members, said spring element having an annular configuration and being made of a metallic cable material extending continuously around the periphery of said first conduit connector member and being attached at a plurality of peripherally spaced mounting portions to the housing and at another plurality of peripherally spaced mounting portions to the first conduit connector member, said mounting portions of the first conduit connector member being peripherally offset to the mounting portions of the housing.

23. The vibration-decoupling device as set forth in claim 22, wherein said housing has a substantially cylindrical shape.

24. The vibration-decoupling device as set forth in claim 22, wherein said second end portion of said housing is connected to the second conduit connector members in a rigid manner.

25. The vibration-decoupling device as set forth in claim 22, wherein at least one of axial and angular relative movements between the first conduit connector member and the first end portion of the housing is stop-limited.

26. The vibration-decoupling device as set forth in claim 22, wherein a tubular heat shield element is fitted to an upstream one of the first and second conduit connector members, said tubular heat shield element protruding into said flexible, bellows-type conduit element.

27. A conduit vibration-decoupling device for installation in exhaust conduit systems of internal combustion engines, comprising a first and second axially spaced conduit connector members connected to each other by a flexible bellows sealing conduit element, and a force transfer means having at least axial pliancy for transferring forces between the first and second conduit connector members, said force transfer means comprising a rigid housing extending between the conduit first and second connector members and over and along the flexible bellows sealing conduit element, said housing having first and second end portions with a first end portion being adjacent said first conduit connector and said second end portion being adjacent said second conduit connector, wherein at least said first end portion is connected by an articulated spring assembly comprising at least one spring element to the adjacent first conduit connector member of the conduit connector members, in which said spring element being a continuous annular element made of a metallic cable material and extending continuously around the periphery of the first conduit connector member and being attached at a plurality of peripherally spaced mounting portions to the housing and at another plurality of peripherally spaced mounting portions to the first conduit connector member, said mounting portions of the first conduit connector member being peripherally offset to the mounting portions of the housing, in which said housing having a substantially cylindrical shape, in which said articulated spring assembly comprising said at least one metallic cable spring element being fully accommodated within said housing, and in which a tubular heat shield element is fitted to an upstream one of the first and second conduit connector members, said tubular heat shield element protruding into said flexible bellows-type conduit element.

* * * * *